United States Patent
Roux et al.

(10) Patent No.: US 12,487,583 B2
(45) Date of Patent: Dec. 2, 2025

(54) PARAMETER OPTIMIZATION METHOD, DEVICE, AND STORAGE MEDIUM

(71) Applicant: Siemens Aktiengesellschaft, Munich (DE)

(72) Inventors: Armin Roux, Erlangen (DE); Bin Zhang, Beijing (CN); Zhong Yang Sun, Beijing (CN); Shun Jie Fan, Beijing (CN); Ming Jie, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 400 days.

(21) Appl. No.: 18/041,442

(22) PCT Filed: Aug. 14, 2020

(86) PCT No.: PCT/CN2020/109361
§ 371 (c)(1),
(2) Date: Feb. 13, 2023

(87) PCT Pub. No.: WO2022/023682
PCT Pub. Date: Feb. 17, 2022

(65) Prior Publication Data
US 2023/0315052 A1    Oct. 5, 2023

(51) Int. Cl.
*G05B 19/4155*    (2006.01)
(52) U.S. Cl.
CPC ............ *G05B 19/4155* (2013.01); *G05B 2219/33099* (2013.01)
(58) Field of Classification Search
None
See application file for complete search history.

(56) References Cited

U.S. PATENT DOCUMENTS

| 10,814,448 | B2 | 10/2020 | Liu et al. |
| 2015/0326939 | A1 | 11/2015 | Dieselberg et al. ........ 725/109 |
| 2020/0282503 | A1 | 9/2020 | Liu et al. |

FOREIGN PATENT DOCUMENTS

| CN | 101 159 586 | 4/2008 | ........ H04L 12/24 |
| CN | 102707666 A | 10/2012 | ........ G05B 19/19 |

(Continued)

OTHER PUBLICATIONS

Guo et al, "A recognition methodology for the key geometric errors of a multi-axis machine tool based on accuracy retentivity analysis", 2019, Wiley Hindawi Complexity, pp. 1-19 (Year: 2019).*

(Continued)

*Primary Examiner* — David Earl Ogg
(74) *Attorney, Agent, or Firm* — Slayden Grubert Beard PLLC

(57) ABSTRACT

Examples of the present disclosure provide a parameter optimization method, device and computer readable storage medium. The method includes: establishing a one-to-one functional relationship between each parameter and each performance index; determining each current correlation coefficient between the parameter and each performance index based on the one-to-one function relationships; obtaining a current weight of each performance index; according to current weights and current correlation coefficients, obtaining a current influence coefficient of each parameter on a comprehensive performance of the performance indexes; and determining important optimization parameters according to the current influence coefficient; for each two parameters, calculating a current correlation coefficient of the two parameters, and determining an adjustment parameter; and performing parameter optimization based on the important optimization parameters and the adjustment (Continued)

parameters. The technical solutions of the present disclosure can improve the parameter optimization efficiency.

14 Claims, 7 Drawing Sheets

(56) References Cited

FOREIGN PATENT DOCUMENTS

| | | | | |
|---|---|---|---|---|
| CN | 104062901 A | 9/2014 | ............ | G05B 13/02 |
| CN | 104880991 A | 9/2015 | ............ | G05B 19/18 |
| CN | 106980905 A * | 7/2017 | ............ | G06Q 10/04 |
| CN | 107 239 339 | 10/2017 | ............... | G06F 9/50 |
| CN | 107 909 204 | 4/2018 | ............ | G06Q 10/04 |
| CN | 109 308 246 | 2/2019 | ............ | G06F 11/34 |
| CN | 110210740 A * | 9/2019 | ....... | G06Q 10/06393 |
| CN | 110 442 974 | 11/2019 | ............ | G06F 17/50 |
| WO | 2020/041955 A1 | 3/2020 | ............ | G06Q 10/06 |

OTHER PUBLICATIONS

Chinese Office Action, Application No. 202080103944.5, 7 pages, Jan. 9, 2025.
Guo, Shijie et al., "A Recognition Methodology for the Key Geometric Errors of a Multi-Axis Machine Tool Based on Accuracy Retentivity Analysis," Complexity, vol. 2019, URL: https://downloads.hindawi.com/journals/complexity/2019/8649496.pdf, 22 pages, Nov. 22, 2019.
Extended European Search Report, Application No. 20949180.2, 12 pages, Apr. 3, 2024.
Search Report for International Application No. PCT/CN2020/109361, 12 pages, May 12, 2021.

* cited by examiner

PARAMETER OPTIMIZATION METHOD, DEVICE, AND STORAGE MEDIUM

CROSS-REFERENCE TO RELATED APPLICATIONS

This application is a U.S. National Stage Application of International Application No. PCT/CN2020/109361 filed Aug. 14, 2020, which designates the United States of America, the contents of which are hereby incorporated by reference in their entirety.

TECHNICAL FIELD

The present disclosure relates to industrial technologies, and more particularly, to a parameter optimization method, device and computer readable storage medium.

BACKGROUND

Digital technology refers to a technology with which computers and networks are used to achieve digital. Digital technology has been applied to a variety of industries and fields, such as traditional manufacturing plants. Digital factory is to provide digital and information services for traditional manufacturing plants by using computer hardware and software technology. Digital factory integrates various systems and databases of factory, product and control, and improves the flexibility and efficiency of factory manufacturing process by means of visualization, simulation and big data.

CNC machining is an important part of modern digital factories. An efficient and intelligent CNC system is necessary. CNC machine tools can process workpieces according to G code. At present, G code can be automatically generated, however the various parameters need to be manually input, which is inefficient and cannot guarantee the inputs are the optimum parameter.

When the external environment or processing requirements change, the optimal combination of CNC machine tool parameters will also change. However, manual calculation and adjustment are required, and the workload is large and the efficiency is low.

SUMMARY

Teachings of the present disclosure include parameter optimization methods and/or systems. Various embodiments include: establishing a one-to-one functional relationship between each parameter and each performance index based on function relationships between each performance index and all parameters established in advance; determining each current correlation coefficient between the parameter and each performance index based on the one-to-one function relationships; obtaining a current weight of each performance index; according to current weights and current correlation coefficients, obtaining a current influence coefficient of each parameter on a comprehensive performance of the performance indexes; and determining a parameter whose current influence coefficient reaches a set high threshold as an important optimization parameter, or determining the first one or more parameters with higher current influence coefficient as important optimization parameters; for each two parameters, calculating a current correlation coefficient of the two parameters according to the current weights and the current correlation coefficient between each of the two parameters and each performance index, and determining the parameter whose current correlation coefficient with the important optimization parameter meets set requirements as an adjustment parameter; and performing parameter optimization based on the important optimization parameters and the adjustment parameters.

In some embodiments, the determining each current correlation coefficient between the parameter and each performance index based on the one-to-one function relationships comprises for a current value of each parameter, determining the tangent slope of the current value in a function image of the one-to-one functional relationship between the parameter and a performance index as the current correlation coefficient between the parameter and the performance index.

In some embodiments, the method further comprises establishing a correlation coefficient table between each parameter and each performance index utilizing the current correlation coefficient between each parameter and each performance index.

In some embodiments, in the correlation coefficient table, adopting different colors to represent different values of the current correlation coefficients to obtain a correlation nephogram of parameters and performance indexes.

In some embodiments, according to current weights and the current correlation coefficients, obtaining a current influence coefficient of each parameter on a comprehensive performance of the performance indexes, comprises: bringing current weight of each performance index into the correlation coefficient table to obtain a weighted correlation coefficient table, and adding weighted current correlation coefficient corresponding to the same parameter in the weighted correlation coefficient table to obtain the current influence coefficient of each parameter on the comprehensive performance.

In some embodiments, the method further comprises: establishing a knowledge map of parameters based on the association coefficient of each two parameters; the knowledge map comprises nodes representing the parameters and connecting lines between nodes representing the association relationship between parameters; and in the knowledge map, the size of each node is directly proportional to the value of the influence coefficient of the parameter represented by the node, and the nodes corresponding to the important optimization parameters and adjustment parameters are highlighted.

In some embodiments, the method further comprises: calculating a comprehensive score representing a comprehensive performance of the performance indexes according to the weights of the performance indexes and the current values of the performance indexes; when the comprehensive score is greater than or equal to a predetermined threshold, determining parameters corresponding to the comprehensive score as final optimization parameters; otherwise, performing the process of determining each current correlation coefficient between the parameter and each performance index based on the one-to-one function relationships; wherein performing parameter optimization based on the important optimization parameters and the adjustment parameters comprises: adjusting values of the parameters according to a predetermined rule based on the principle of adjusting values of the important optimization parameter and adjustment parameters first; or adjusting only values of the important optimization parameter and adjustment parameters; then returning to the process of establishing a one-to-one functional relationship between each parameter and each performance index based on function relationships between each performance index and all parameters established in advance.

In some embodiments, in response of a change of the current weights, retuning to the process of calculating a comprehensive score representing a comprehensive performance of the performance indexes according to the weights of the performance indexes and the current values of the performance indexes.

In some embodiments, in response of a change of the important optimization parameter and adjustment parameters, performing the parameter optimization based on changed important optimization parameters and the adjustment parameters.

As another example, some embodiments include a parameter optimization device comprising: a first module, to establish a one-to-one functional relationship between each parameter and each performance index based on function relationships between each performance index and all parameters established in advance; a second module, to determine each current correlation coefficient between the parameter and each performance index based on the one-to-one function relationships; a third module, to obtain a current weight of each performance index; a fourth module, according to current weights and the current correlation coefficients, to obtain a current influence coefficient of each parameter on a comprehensive performance of the performance indexes; and to determine a parameter whose current influence coefficient reaches a set high threshold as an important optimization parameter, or to determine the first one or more parameters with higher current influence coefficient as important optimization parameters; a fifth module, for each two parameters, to calculate a current correlation coefficient of the two parameters according to the current weights and the current correlation coefficient between each of the two parameters and each performance index, and to determine the parameter whose current correlation coefficient with the important optimization parameter meets set requirements as an adjustment parameter; and a sixth module, to perform parameter optimization based on the important optimization parameters and the adjustment parameters.

In some embodiments, the device further comprises: a seventh module, to establish a correlation coefficient table between each parameter and each performance index utilizing the current correlation coefficient between each parameter and each performance index; in the correlation coefficient table, different colors are adopted to represent different values of the current correlation coefficients to obtain a correlation nephogram of parameters and performance indexes.

In some embodiments, the fourth module is to bring current weight of each performance index into the correlation coefficient table to obtain a weighted correlation coefficient table, and to add weighted current correlation coefficient corresponding to the same parameter in the weighted correlation coefficient table to obtain the current influence coefficient of each parameter on the comprehensive performance.

In some embodiments, the device further comprises an eighth module, to establish a knowledge map of parameters based on the association coefficient of each two parameters; the knowledge map comprises nodes representing the parameters and connecting lines between nodes representing the association relationship between parameters; in the knowledge map, the size of each node is directly proportional to the value of the influence coefficient of the parameter represented by the node, and the nodes corresponding to the important optimization parameters and adjustment parameters are highlighted.

In some embodiments, the device further comprises: a ninth module, to calculate a comprehensive score representing a comprehensive performance of the performance indexes according to the weights of the performance indexes and the current values of the performance indexes; and a tenth module, to determine parameters corresponding to the comprehensive score as final optimization parameters when the comprehensive score is greater than or equal to a predetermined threshold; otherwise, to inform the second module to perform corresponding processes; the sixth module, to adjust values of the parameters according to a predetermined rule based on the principle of adjusting values of the important optimization parameter and adjustment parameters first; or to adjust only values of the important optimization parameter and adjustment parameters; then indicate the first module to perform corresponding processes.

As another example, some embodiments include a parameter optimization device comprises: at least one memory, to store a computer program; and at least one processor, to call the computer program stored in the at least one memory to perform a parameter optimization method as described herein.

As another example, some embodiments include a non-transitory computer-readable storage medium, on which a computer program is stored, characterized in that, the computer program is to be executed by a processor to implement one or more parameter optimization methods as described herein.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures. In the figures.

Figure 1:
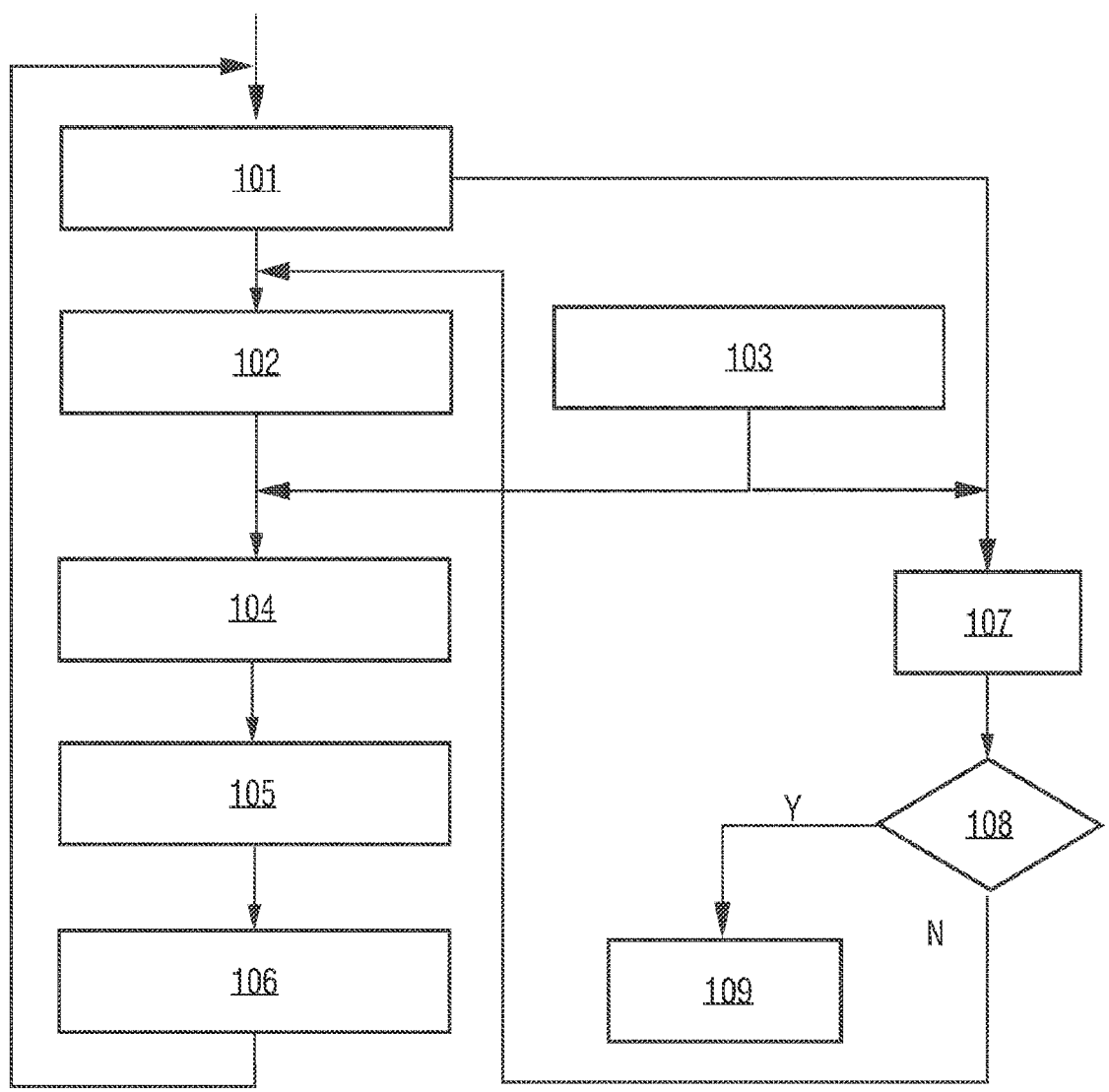
FIG. 1 is a flow diagram illustrating a parameter optimization method incorporating teachings of the present disclosure.

The reference numerals are as follows:

| Reference numeral | Object |
|---|---|
| 101~109 | processes |
| 801 | first module |
| 802 | second module |
| 803 | third module |
| 804 | fourth module |
| 805 | fifth module |
| 806 | sixth module |
| 807 | seventh module |
| 808 | eighth module |
| 809 | ninth module |
| 810 | tenth module |
| 91 | memory |
| 92 | processor |

DETAILED DESCRIPTION

Some examples of the present disclosure include parameter optimization methods, devices, and computer readable storage media to improve the parameter optimization efficiency. For example, a parameter optimization method may include: establishing a one-to-one functional relationship between each parameter and each performance index based on function relationships between each performance index and all parameters established in advance; determining each current correlation coefficient between the parameter and each performance index based on the one-to-one function relationships; obtaining a current weight of each performance index; according to current weights and current correlation coefficients, obtaining a current influence coefficient of each parameter on a comprehensive performance of the performance indexes; and determining a parameter whose current influence coefficient reaches a set high threshold as an important optimization parameter, or determining the first one or more parameters with higher current influence coefficient as important optimization parameters; for each two parameters, calculating a current correlation coefficient of the two parameters according to the current weights and the current correlation coefficient between each of the two parameters and each performance index, and determining the parameter whose current correlation coefficient with the important optimization parameter meets set requirements as an adjustment parameter; and performing parameter optimization based on the important optimization parameters and the adjustment parameters.

In some embodiments, the determining each current correlation coefficient between the parameter and each performance index based on the one-to-one function relationships includes: for a current value of each parameter, determining the tangent slope of the current value in a function image of the one-to-one functional relationship between the parameter and a performance index as the current correlation coefficient between the parameter and the performance index.

In some embodiments, the method further includes: establishing a correlation coefficient table between each parameter and each performance index utilizing the current correlation coefficient between each parameter and each performance index.

Some embodiments include, in the correlation coefficient table, adopting different colors to represent different values of the current correlation coefficients to obtain a correlation nephogram of parameters and performance indexes.

In some embodiments, according to current weights and the current correlation coefficients, obtaining a current influence coefficient of each parameter on a comprehensive performance of the performance indexes, includes: bringing current weight of each performance index into the correlation coefficient table to obtain a weighted correlation coefficient table, and adding weighted current correlation coefficient corresponding to the same parameter in the weighted correlation coefficient table to obtain the current influence coefficient of each parameter on the comprehensive performance.

In some embodiments, the method further includes: establishing a knowledge map of parameters based on the association coefficient of each two parameters; the knowledge map includes nodes representing the parameters and connecting lines between nodes representing the association relationship between parameters; in the knowledge map, the size of each node is directly proportional to the value of the influence coefficient of the parameter represented by the node, and the nodes corresponding to the important optimization parameters and adjustment parameters are highlighted.

In some embodiments, the method further includes: calculating a comprehensive score representing a comprehensive performance of the performance indexes according to the weights of the performance indexes and the current values of the performance indexes; when the comprehensive score is greater than or equal to a predetermined threshold, determining parameters corresponding to the comprehensive score as final optimization parameters; otherwise, performing the process of determining each current correlation coefficient between the parameter and each performance index based on the one-to-one function relationships; wherein performing parameter optimization based on the important optimization parameters and the adjustment parameters includes: adjusting values of the parameters according to a predetermined rule based on the principle of adjusting values of the important optimization parameter and adjustment parameters first; or adjusting only values of the important optimization parameter and adjustment parameters; then returning to the process of establishing a one-to-one functional relationship between each parameter and each performance index based on function relationships between each performance index and all parameters established in advance.

In an example, in response of a change of the current weights, retuning to the process of calculating a comprehensive score representing a comprehensive performance of the performance indexes according to the weights of the performance indexes and the current values of the performance indexes.

In some embodiments, in response of a change of the important optimization parameter and adjustment parameters, performing the parameter optimization based on changed important optimization parameters and the adjustment parameters.

In some embodiments, a parameter optimization device incorporating teachings of the present disclosure includes: a first module, to establish a one-to-one functional relationship between each parameter and each performance index based on function relationships between each performance index and all parameters established in advance; a second module, to determine each current correlation coefficient between the parameter and each performance index based on the one-to-one function relationships; a third module, to obtain a current weight of each performance index; a fourth module, according to current weights and the current correlation coefficients, to obtain a current influence coefficient of each parameter on a comprehensive performance of the performance indexes; and to determine a parameter whose current influence coefficient reaches a set high threshold as an important optimization parameter, or to determine the first one or more parameters with higher current influence coefficient as important optimization parameters; a fifth module, for each two parameters, to calculate a current correlation coefficient of the two parameters according to the current weights and the current correlation coefficient between each of the two parameters and each performance index, and to determine the parameter whose current correlation coefficient with the important optimization parameter meets set requirements as an adjustment parameter; and a sixth module, to perform parameter optimization based on the important optimization parameters and the adjustment parameters.

In some embodiments, the device further includes: a seven module, to establish a correlation coefficient table between each parameter and each performance index utilizing the current correlation coefficient between each parameter and each performance index; in the correlation coefficient table, different colors are adopted to represent different values of the current correlation coefficients to obtain a correlation nephogram of parameters and performance indexes.

In some embodiments, the fourth module is to bring current weight of each performance index into the correlation coefficient table to obtain a weighted correlation coefficient table, and to add weighted current correlation coefficient corresponding to the same parameter in the weighted correlation coefficient table to obtain the current influence coefficient of each parameter on the comprehensive performance.

In some embodiments, the device further includes: an eighth module, to establish a knowledge map of parameters based on the association coefficient of each two parameters; the knowledge map includes nodes representing the parameters and connecting lines between nodes representing the association relationship between parameters; in the knowledge map, the size of each node is directly proportional to the value of the influence coefficient of the parameter represented by the node, and the nodes corresponding to the important optimization parameters and adjustment parameters are highlighted.

In some embodiments, the device further includes: a ninth module, to calculate a comprehensive score representing a comprehensive performance of the performance indexes according to the weights of the performance indexes and the current values of the performance indexes; and a tenth module, to determine parameters corresponding to the comprehensive score as final optimization parameters when the comprehensive score is greater than or equal to a predetermined threshold; otherwise, to inform the second module to perform corresponding processes; the sixth module, to adjust values of the parameters according to a predetermined rule based on the principle of adjusting values of the important optimization parameter and adjustment parameters first; or to adjust only values of the important optimization parameter and adjustment parameters; then indicate the first module to perform corresponding processes.

In some embodiments, a parameter optimization device incorporating teachings of the present disclosure includes: at least one memory, to store a computer program; and at least one processor, to call the computer program stored in the at least one memory to perform one or more of the parameter optimization methods described herein.

In some embodiments, a non-transitory computer-readable storage medium stores a computer program to be executed by a processor to implement one or more of the parameter optimization methods described herein.

In the various embodiments of the present disclosure, each performance index can be assigned a weight and all parameters can be optimized simultaneously based on the comprehensive performance. According to the influence coefficient of each parameter on the comprehensive performance, targeted optimization can be realized and efficiency can be improved. Further adjustments can be achieved based on the degree of association between the various parameters to compensate for the possible degradation of other performance indicators. Thus parameter optimization efficiency can be improved.

In addition, the weight distribution can be changed at any time according to the external environment and processing requirements, and the direction of parameter optimization can be adjusted.

In the examples of the present disclosure, considering that the change of a certain parameter may lead to the change of more than one performance index, the association degree between different parameters is different, and the influence of different parameters on different performance index is also different. However, the traditional parameter optimization technology can only optimize some parameters, but cannot synchronously optimize all input parameters, and the traditional parameter optimization technology usually only considers the improvement of a certain performance, but does not consider other performance degradation problems caused by the performance improvement, which makes the efficiency of parameter optimization low and lack of coordination.

Therefore, in the examples of the present disclosure, a mapping relationship library of parameters and performance indexes is established, and then a correlation coefficient between each parameter and each performance index is determined according a functional relationship between each parameter and each performance index. According the correlation coefficients between each parameter and each performance index and the predetermined weight of each performance index, important optimization parameters are determined. A knowledge map of parameters is established based on the association coefficients between each two parameters which are calculated according to the corresponding correlation coefficients and weight distribution. According to the association coefficients, the parameters closely associated with the important optimization parameters are set as adjusting parameters. The optimization is performed based on the important optimization parameters and the adjusting parameters.

In some embodiments, a comprehensive score of performance indexes is calculated according to currently determined performance index values and predetermined weights of each performance index, when the comprehensive score satisfies a preset condition, the parameters corresponding to the comprehensive score are the final optimization parameters; otherwise, the optimization is performed based on the important optimization parameters and the adjusting parameters by adjusting the values of the important optimization parameters and the adjusting parameters.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

FIG. 1 is a flow diagram illustrating a parameter optimization method incorporating teachings of the present disclosure. As shown in FIG. 1, the method may include the following processes:

At block 101, based on function relationships between each performance index and all parameters established in advance, a one-to-one functional relationship between each parameter and each performance index is established. At the block 101, a functional relationship between each evaluation index y and all parameters x may be established, and the initial templates of all functions may be kept in a database. The developer can adjust the corresponding coefficients of the function according to the characteristics of different machine tools.

For example, the above mentioned functional relationship can be expressed as the following formula (1):

$$\begin{bmatrix} y_1 \\ y_2 \\ \vdots \\ y_m \end{bmatrix} = M \begin{bmatrix} x_1 \\ x_2 \\ \vdots \\ x_n \end{bmatrix} \quad (1)$$

Wherein, M is a predetermined coefficient matrix, m is the number of performance indexes, and n is the number of parameters.

According to the calculation formula $y_i = f_i(x_1, x_2, \ldots, x_n)$; $i = 1, 2, \ldots, m$ of each performance index, through the variable control, the one-to-one function relationship $y_i = f_i(x_j)$; $i = 1, 2, \ldots, m$; $j = 1, 2, \ldots, n$ between each performance index and each parameter is determined by giving the values of other parameters. That is to say, for each current parameter, the value of other parameters except the current parameter is substituted into the function relationship between each performance index and all parameters established in advance, and the one-to-one functional relationship between each parameter and each performance index is obtained.

Figure 2:
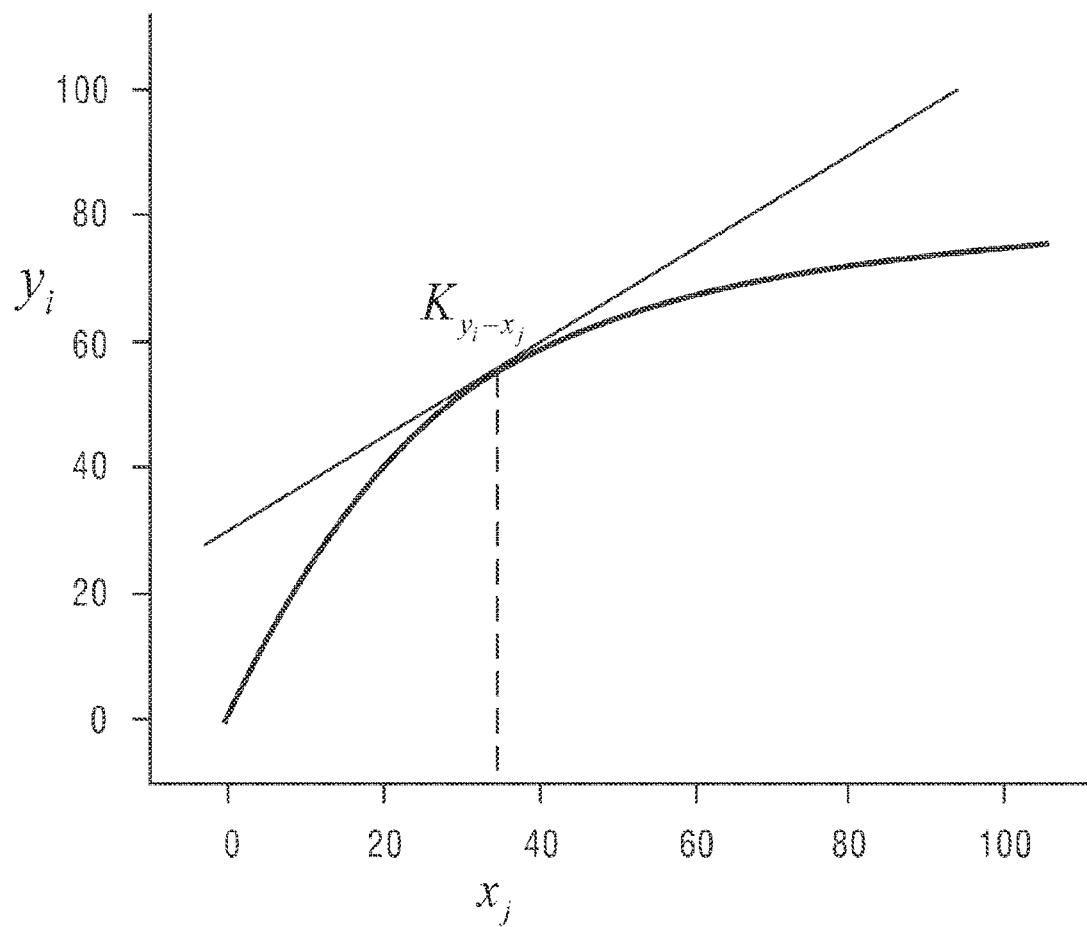
FIG. 2 is a schematic diagram illustrating one-to-one functional relationship between a performance index and a parameter incorporating teachings of the present disclosure.

At block 102, for a current value of each parameter, each current correlation coefficient between the parameter and each performance index is determined based on the one-to-one function relationships. At the block 102, for the current value of each parameter, the tangent slope $$\frac{\partial y_i}{\partial x_j}$$

of the current value in the function image corresponding to the one-to-one functional relationship between the parameter and each performance index may be defined as the current correlation coefficient $$K_{y_i - x_j} = \frac{\partial y_i}{\partial x_j}$$

between the parameter and the performance index. For example, FIG. 2 is a schematic diagram illustrating one-to-one functional relationship between a performance index and a parameter according to an example of the present disclosure.

Figure 3:
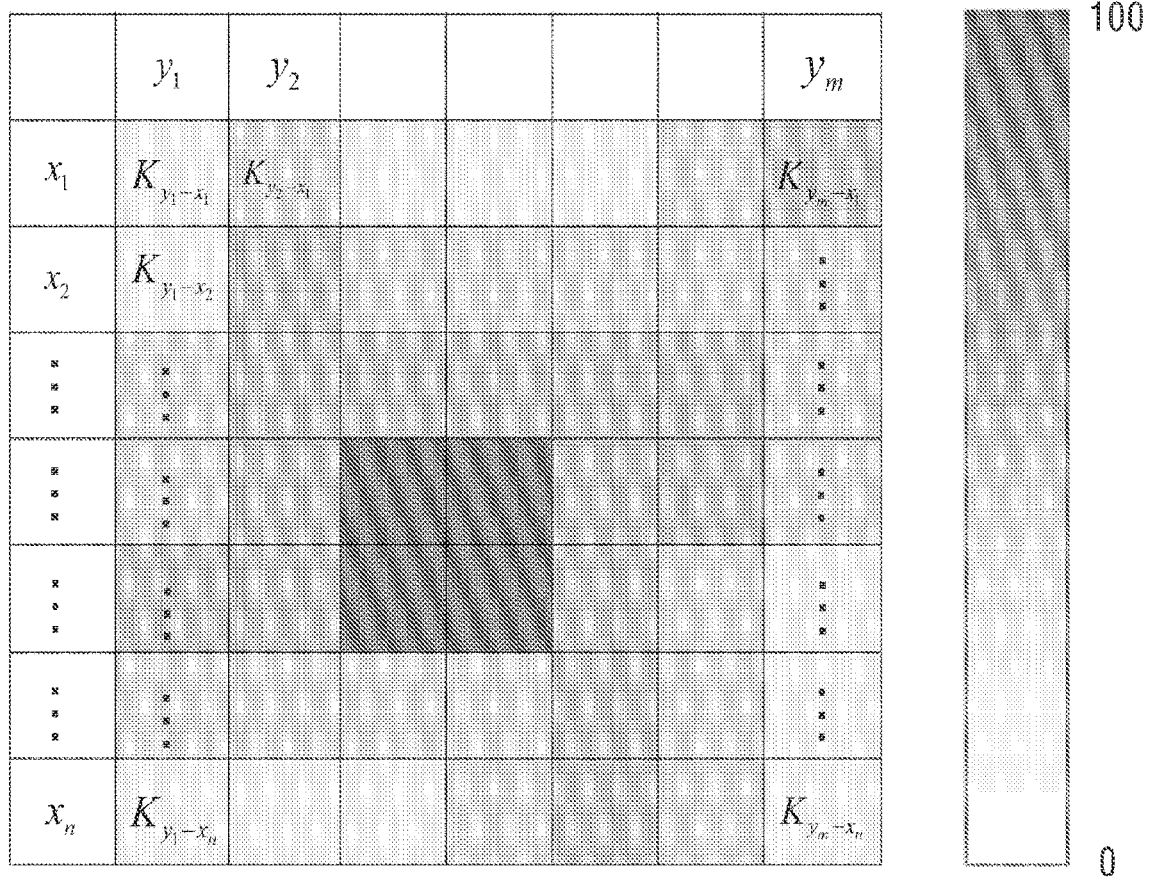
FIG. 3 is a schematic diagram illustrating the nephogram of parameters and performance indicators incorporating teachings of the present disclosure.

In some embodiments, after the current correlation coefficient between each parameter and each performance index is determined, a correlation coefficient table between each parameter and each performance index may be established. Furthermore, in the correlation coefficient table, different colors may be adopted to represent different values of the current correlation coefficients, and then a correlation nephogram of parameters and performance indexes is obtained. For example, FIG. 3 is a schematic diagram illustrating the nephogram of parameters and performance indexes according to an example of the present disclosure. In an example, the nephogram of parameters and performance indexes may be shown to the user.

At block 103, a current weight of each performance index is obtained. In an example, the current weight of each performance index may be preset and stored, and at the block 103, stored current weight of each performance index may be obtained.

In some embodiments, users can assign different significant coefficient $s_i$ to each performance index through an interface, in response to receiving the significant coefficient $s_i$, the significant coefficients of all performance indexes are normalized to obtain the current weight of each performance index as following formula (2):

$$w_i = \frac{s_i}{s_1 + s_2 + \ldots + s_m} \quad (2)$$

The weight distribution such as the significant coefficients may be adjusted at any time according to changes in the external environment and processing requirements.

Figure 4:
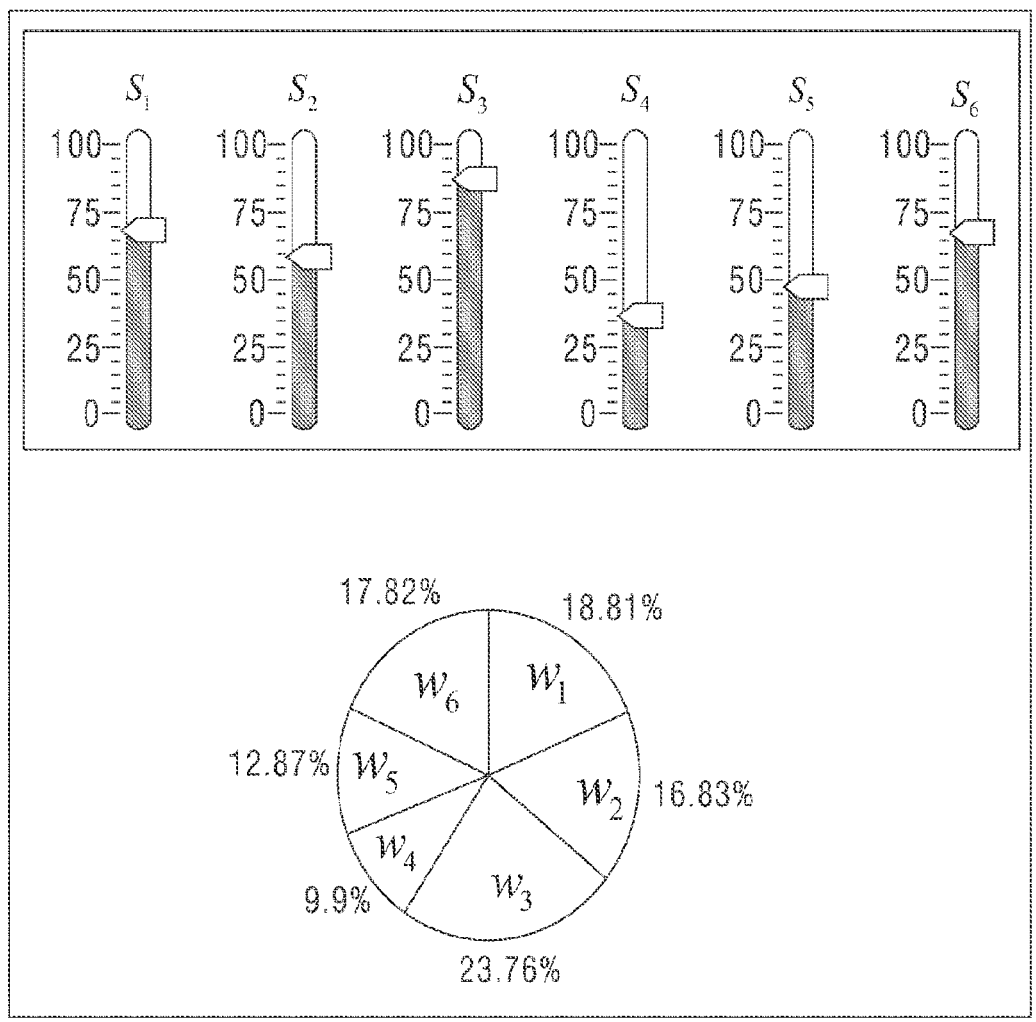
FIG. 4 is a schematic diagram illustrating the current weights of performance indexes incorporating teachings of the present disclosure.

For example, FIG. 4 is a schematic diagram illustrating the current weights of performance indexes incorporating teachings of the present disclosure. FIG. 4 may be shown to the user, and the user can adjust the values of significant coefficients, and then the pie chart of the weights in the FIG. 4 may be changed accordingly.

At block 104, according to the current weights and the current correlation coefficients, a current influence coefficient of each parameter on a comprehensive performance of the performance indexes is obtained, and an important optimization parameter may be determined according to the current influence coefficients. For example, a parameter whose current influence coefficient reaches a set high threshold is determined as an important optimization parameter, or the first one or more parameters with higher current influence coefficient are determined as important optimization parameters.

At the block 104, the corresponding current weight of each performance index may be bring into the correlation coefficient table to obtain a weighted correlation coefficient table, and then weighted current correlation coefficient corresponding to the same parameter in the weighted correlation coefficient table are added to obtain the current influence coefficient of each parameter on the comprehensive performance.

For example, based on the nephogram of parameters and performance indexes shown in FIG. 3, the weights can be bring into the correlation coefficient table to get the weighted correlation coefficient table, and each line can be added to get the current influence coefficient $h_i$ of each parameter on the comprehensive score as following formula (4):

$$h_i = \frac{w_1 \frac{\partial y_1}{x_i} + w_2 \frac{\partial y_2}{x_i} + \ldots + w_m \frac{\partial y_m}{x_i}}{m} \quad (4)$$

Every time the weight distribution such as the significant coefficients is adjusted, the block 104 is performed.

The important optimization parameters may be further filtrated later. For example, for a parameter that is not suitable for adjustment due to the actual situation, users can filter the parameter through the interactive panel, and no longer optimize it as important optimization parameter.

At block 105, for each two parameters, a current correlation coefficient of the two parameters is calculated according to the current weights of performance indexes and the current correlation coefficient between each of the two parameters and each performance index; the parameter whose current correlation coefficient with the important optimization parameter meets the set requirements for example larger than or equal to a threshold is determined as the adjustment parameter, namely the parameters closely associated with the important optimization parameters are determined as adjusting parameters.

Figure 5:
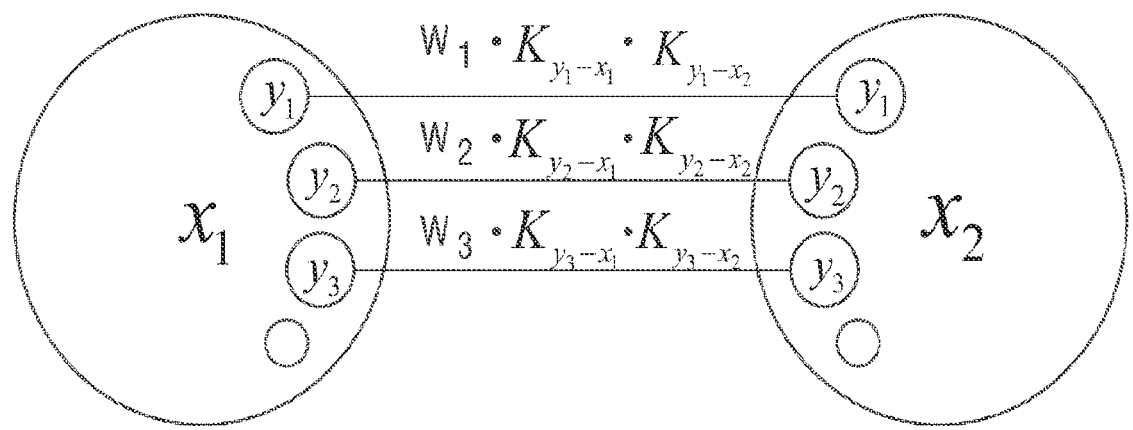
FIG. 5 is a schematic diagram illustrating the association coefficients between each two parameters incorporating teachings of the present disclosure.

FIG. 5 is a schematic diagram illustrating the association coefficients between each two parameters incorporating teachings of the present disclosure. As shown in FIG. 5, the current correlation coefficient $R_{x_1-x_2}$ between parameters $x_1$ and $x_2$ may be calculated according to the following formula (5):

$$R_{x_1-x_2} = w_1 \cdot |K_{y_1-x_1}| \cdot |K_{y_1-x_2} + w_2| \cdot |K_{y_2-x_1}| \cdot K_{y_2-x_2} + \ldots \quad (5)$$

Furthermore, a knowledge map of the parameters may be established, the knowledge map includes nodes representing the parameters and connecting lines between nodes representing the association relationship between parameters. The degree of association between each two parameters is determined by the association coefficients. In addition, in the knowledge map, the size of each node may be directly proportional to the value of the influence coefficient of the parameter represented by the node, and the nodes corresponding to the important optimization parameters and adjustment parameters may be highlighted. In addition, the length of the connecting line can be directly proportional to the value of the association coefficient.

Figure 6:
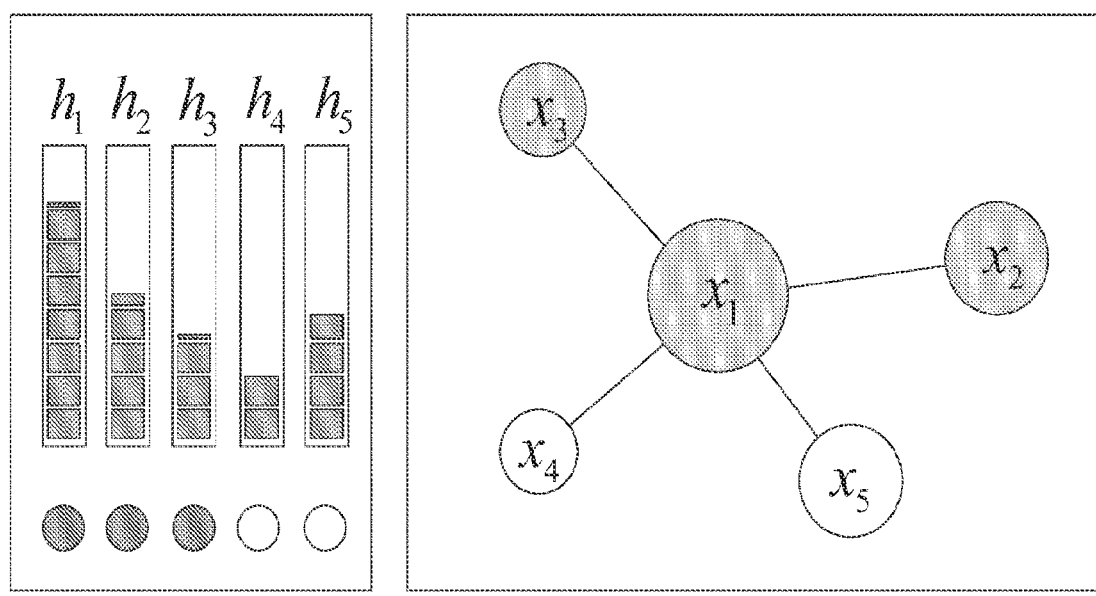
FIG. 6 is a schematic diagram illustrating the current influence coefficient h of each parameter and the knowledge map of parameters incorporating teachings of the present disclosure.

For example, FIG. 6 is a schematic diagram illustrating the current influence coefficient $h_i$ of each parameter and the knowledge map of parameters incorporating teachings of the present disclosure. As shown in FIG. 6, the parameter $x_1$ is the important optimization parameter and the parameters $x_2$ and $x_3$ are adjustment parameters, so the parameters $x_1$, $x_2$ and $x_3$ are highlighted in FIG. 6.

The adjusting parameters can be further filtrated later. For example, for a parameter that is not suitable for adjustment due to the actual situation, users can filter the parameter through the interactive panel, and no longer optimize it as adjustment parameter.

At block 106, parameter optimization is performed based on the important optimization parameters and the adjustment parameters. At the block 106, in an example, when the parameters are not the final determined parameters, values of the parameters are adjusted according to a predetermined rule based on the principle of adjusting values of the important optimization parameter and adjustment parameters first, then return to block 101. In another example, when the parameters are not the final determined parameters, only values of the important optimization parameter and adjustment parameters are adjusted, and then return to block 101.

At the block 106, the process of parameter optimization may be performed according to a conventional parameter optimization technology. In some embodiments, the method may further include the following processes.

At block 107, according to the weights of the performance indexes and the current values of the performance indexes, a comprehensive score representing a comprehensive performance of the performance indexes may be calculated according to the formula (3):

$$E = w_1 \cdot y_1 + w_2 \cdot y_2 + \ldots + w_m y_m \quad (3)$$

The current values of the performance indexes may be calculated according to the one-to-one functional relationship between each parameter and each performance index and the current value of each parameter when the current values of parameters are determined.

At block 108, it is determined that whether the comprehensive score is greater than or equal to a predetermined threshold, when the comprehensive score is greater than or equal to the set threshold, block 109 is performed; otherwise, block 102 is performed.

At block 109, the parameters corresponding to the comprehensive score are determined as the final optimization parameters to be recommended to the user.

Figure 7:
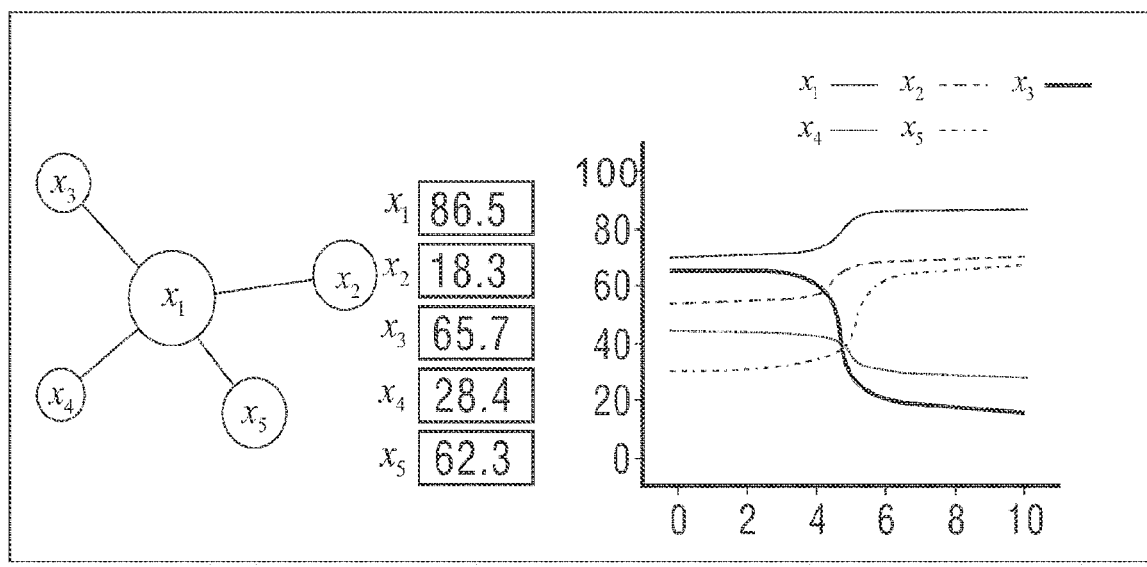
FIG. 7 is a schematic diagram illustrating the change of parameters, performance indexes and comprehensive scores during the process of optimization incorporating teachings of the present disclosure.
Figure 7:
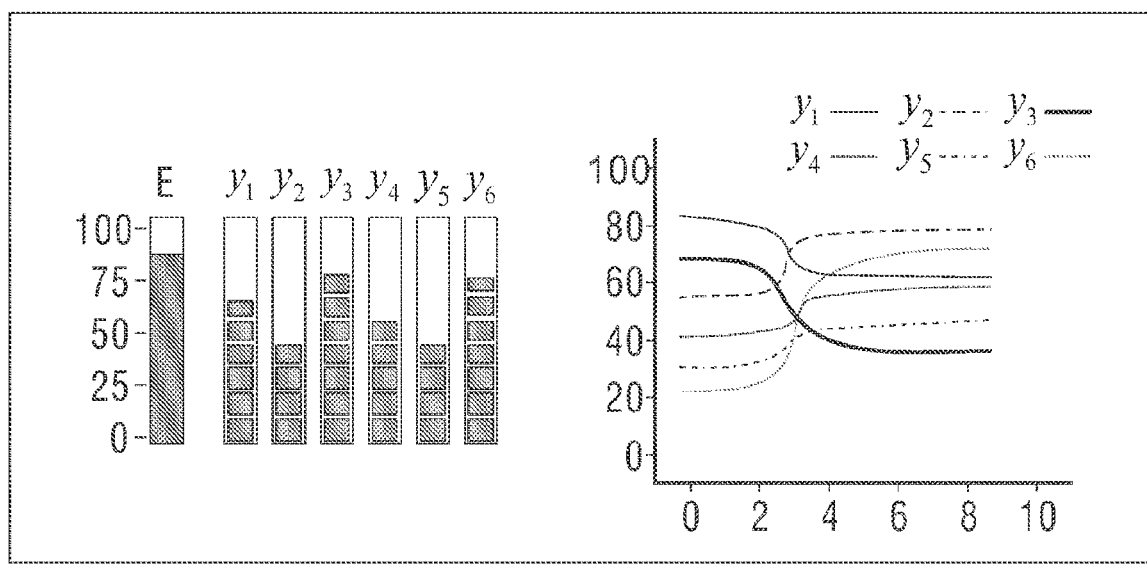

For example, FIG. 7 is a schematic diagram illustrating the change of parameters, performance indexes and comprehensive scores during the process of optimization incorporating teachings of the present disclosure. As shown in FIG. 7, the influence coefficients and association coefficients of the parameters are reflected by the dynamic knowledge graph in the optimization process, and the new important optimization parameters and adjusting parameters can be further selected. In addition, the current values of the parameters, the current values of the performance indexes, the current comprehensive score and the adjustment trajectory of the parameters and performance indexes are all dynamically reflected.

In an example, the optimization algorithm may adopt the genetic algorithm as the prototype. The comprehensive score considering the weight of the performance index is taken as the fitness function, and the iterative calculation is performed. The variation and crossover frequency of the important optimization parameters and adjusting parameters are significantly higher than other parameters.

During the optimization process, the values of the various parameters are constantly changing, so the association coefficients of the parameters also changes synchronously. At this time, the dynamic knowledge graph of the parameters is obtained. When important optimization and adjusting parameters are changed, iterative calculation pauses. After the new important optimization and adjusting parameters are designated, the calculation continues.

After re-adjusting the weight distribution of each performance index, the new comprehensive score will be used as the fitness function, and each parameter before the re-adjustment will be used as the initial value for new iterative calculation.

Figure 8:
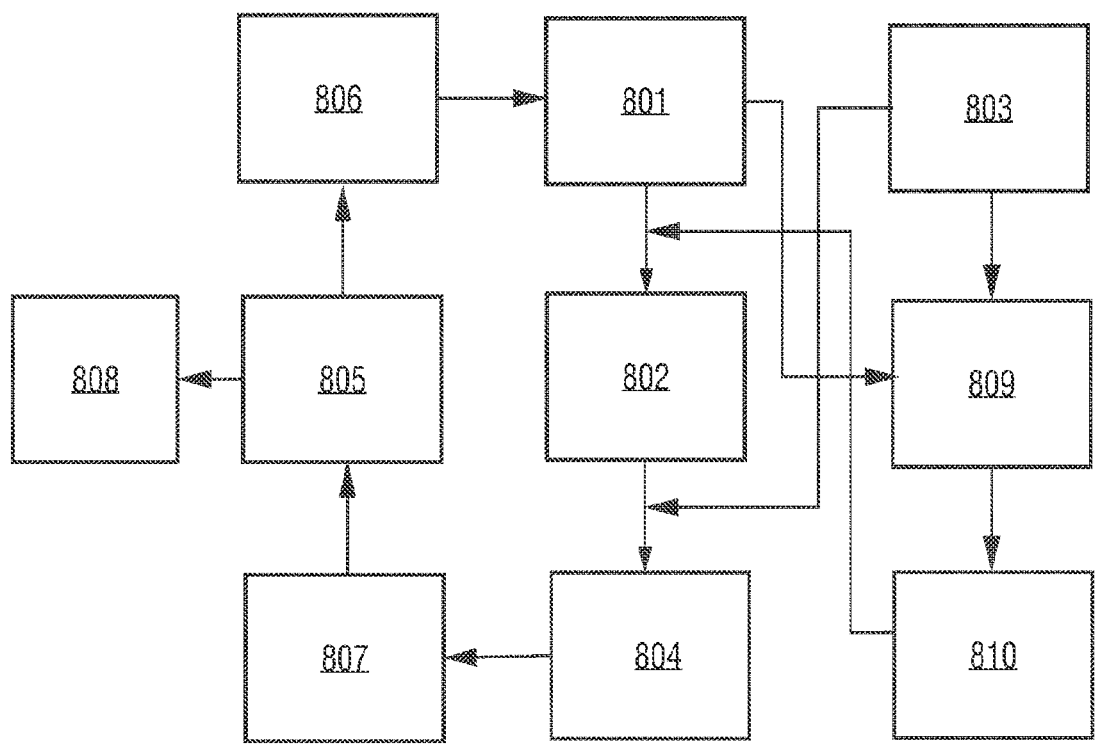
FIG. 8 is a schematic diagram illustrating a parameter optimization device incorporating teachings of the present disclosure.

FIG. 8 is a schematic diagram illustrating a parameter optimization device incorporating teachings of the present disclosure. The device may be used to perform the method shown in FIG. 1. For the contents not disclosed in detail in the device examples of the disclosure, please refer to the corresponding description in the method examples of the disclosure, and will not be repeated hereinafter. As shown in FIG. 8, the device may include a first module 801, a second module 802, a third module 803, a fourth module 804, a fifth module 805 and a sixth module 806. In some examples, the device may further include one or more of a seventh module 807, an eighth module 808, a ninth module 809 and a tenth module 810.

The first module 801 is configured to establish a one-to-one functional relationship between each parameter and each performance index based on function relationships between each performance index and all parameters established in advance.

The second module 802 is configured to determine each current correlation coefficient between the parameter and each performance index based on the one-to-one function relationships.

The third module 803 is configured to obtain a current weight of each performance index.

The fourth module 804 is configured to obtain a current influence coefficient of each parameter on a comprehensive performance of the performance indexes according to current weights and the current correlation coefficients; and to determine a parameter whose current influence coefficient reaches a set high threshold as an important optimization parameter, or to determine the first one or more parameters with higher current influence coefficient as important optimization parameters.

The fifth module 805 is configured, for each two parameters, to calculate a current correlation coefficient of the two parameters according to the current weights and the current correlation coefficient between each of the two parameters and each performance index, and to determine the parameter whose current correlation coefficient with the important optimization parameter meets set requirements as an adjustment parameter.

The sixth module 806 is configured to perform parameter optimization based on the important optimization parameters and the adjustment parameters.

The seventh module 807 is configured to establish a correlation coefficient table between each parameter and each performance index utilizing the current correlation coefficient between each parameter and each performance index; in the correlation coefficient table, different colors are adopted to represent different values of the current correlation coefficients to obtain a correlation nephogram of parameters and performance indexes.

In an example, the fourth module 804 brings current weight of each performance index into the correlation coefficient table to obtain a weighted correlation coefficient table, and adds weighted current correlation coefficient corresponding to the same parameter in the weighted correlation coefficient table to obtain the current influence coefficient of each parameter on the comprehensive performance.

The eighth module 808 is configured to establish a knowledge map of parameters based on the association coefficient of each two parameters; the knowledge map comprises nodes representing the parameters and connecting lines between nodes representing the association relationship between parameters. in the knowledge map, the size of each node is directly proportional to the value of the influence coefficient of the parameter represented by the node, and the nodes corresponding to the important optimization parameters and adjustment parameters are highlighted.

The ninth module 909 is configured to calculate a comprehensive score representing a comprehensive performance of the performance indexes according to the weights of the performance indexes and the current values of the performance indexes.

The tenth module 910 is configured to determine parameters corresponding to the comprehensive score as final optimization parameters when the comprehensive score is greater than or equal to a predetermined threshold; otherwise, to inform the second module to perform corresponding processes.

In an example, the sixth module 806 is configured to adjust values of the parameters according to a predetermined rule based on the principle of adjusting values of the important optimization parameter and adjustment parameters first; or to adjust only values of the important optimization parameter and adjustment parameters; and then indicate the first module to perform corresponding processes.

In fact, the parameter optimization device provided by this implementation manner of the present disclosure may be specifically implemented in various manners. For example, the parameter optimization device may be compiled, by using an application programming interface that complies with a certain regulation, as a plug-in that is installed in an intelligent terminal, or may be encapsulated into an application program for a user to download and use.

When compiled as a plug-in, the parameter optimization device may be implemented in various plug-in forms such as ocx, dll, and cab. The parameter optimization device provided by this implementation manner of the present disclosure may also be implemented by using a specific technology, such as a Flash plug-in technology, a RealPlayer plug-in technology, an MMS plug-in technology, a MIDI staff plug-in technology, or an ActiveX plug-in technology.

The parameter optimization method provided by this implementation manner of the present disclosure may be stored in various storage mediums in an instruction storage manner or an instruction set storage manner. These storage mediums include, but are not limited to: a floppy disk, an optical disc, a DVD, a hard disk, a flash memory, a USB flash drive, a CF card, an SD card, an MMC card, an SM card, a memory stick, and an xD card.

In addition, the parameter optimization method for provided by this implementation manner of the present disclosure may also be applied to a storage medium based on a flash memory (Nand flash), such as USB flash drive, a CF card, an SD card, an SDHC card, an MMC card, an SM card, a memory stick, and an xD card.

Moreover, it should be clear that an operating system operated in a computer can be made, not only by executing program code read by the computer from a storage medium, but also by using an instruction based on the program code, to implement some or all actual operations, so as to implement functions of any embodiment in the foregoing embodiments.

Figure 9:
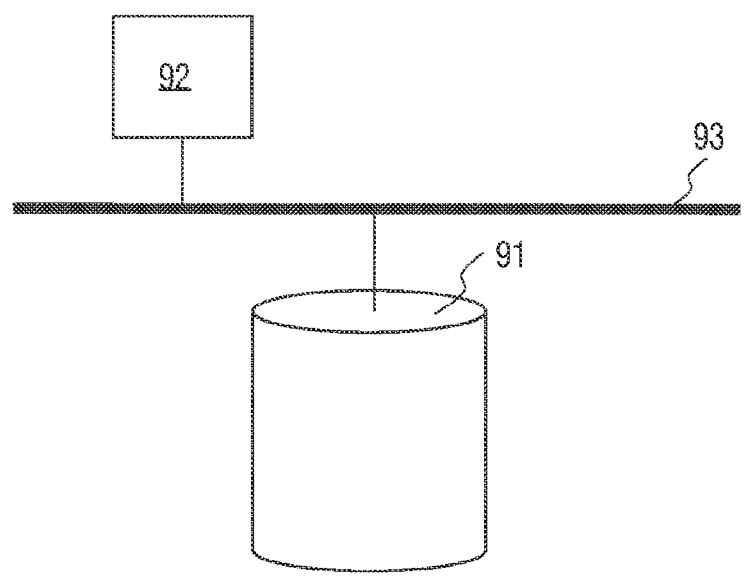
FIG. 9 is a schematic diagram illustrating another parameter optimization device incorporating teachings of the present disclosure.

For example, FIG. 9 is a schematic diagram illustrating another parameter optimization device incorporating teachings of the present disclosure. The device may be used to perform the method shown in FIG. 1, or to implement the device in FIG. 8. As shown in FIG. 9, the device may include at least one memory 91 and at least one processor 92. In addition, some other components may be included, such as communication port, input/output controller, network communication interface, etc. These components communicate through bus 93, etc.

At least one memory 91 is configured to store a computer program 911. In one example, the computer program can be understood to include various modules of the device shown in FIG. 8. In addition, at least one memory 91 may store an operating system or the like. Operating systems include but are not limited to: Android operating system, Symbian operating system, windows operating system, Linux operating system, etc.

At least one processor 92 is configured to call the computer program stored in at least one memory 91 to perform a parameter optimization method described in examples of the present disclosure. The processor 92 can be CPU, processing unit/module, ASIC, logic module or programmable gate array, etc. It can receive and send data through the communication port.

The I/O controller has a display and an input device, which is used to input, output and display relevant data.

In some embodiments, each performance index can be assigned a weight and all parameters can be optimized simultaneously based on the comprehensive performance. According to the influence coefficient of each parameter on the comprehensive performance, targeted optimization can be realized and efficiency can be improved. Further adjustments can be achieved based on the degree of association between the various parameters to compensate for the possible degradation of other performance indicators. Thus parameter optimization efficiency can be improved.

In some embodiments, the weight distribution can be changed at any time according to the external environment and processing requirements, and the direction of parameter optimization can be adjusted. Furthermore, the function relationship between performance indexes and each parameter can be adjusted according to the characteristics of different machine tools.

It should be understood that, as used herein, unless the context clearly supports exceptions, the singular forms "a" ("a", "an", "the") are intended to include the plural forms. It should also be understood that, "and/or" used herein is intended to include any and all possible combinations of one or more of the associated listed items.

The example embodiments in the present disclosure are only used for description, and do not represent all of the implementations. The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

What is claimed is:

1. A parameter optimization method comprising:
    establishing a one-to-one functional relationship between each parameter of a set of parameters and each performance index of a set of performance indexes based on function relationships between each performance index and all parameters of the set of parameters;
    determining each current correlation coefficient between the parameter and each performance index based on the one-to-one function relationships;
    obtaining a current weight of each performance index;
    according to the current weights and the current correlation coefficients, obtaining a current influence coefficient of each parameter on a comprehensive performance of the performance indexes;
    determining a parameter whose current influence coefficient reaches a set high threshold as an important optimization parameter, or determining a first one of the one or more parameters with a highest current influence coefficient of the one or more parameters as the important optimization parameter;
    for each two parameters, calculating a current correlation coefficient of the two parameters according to the current weights and the current correlation coefficient between each of the two parameters and each performance index, and determining the parameter whose current correlation coefficient with the important optimization parameter meets set requirements as an adjustment parameter;
    performing parameter optimization based on the important optimization parameters and the adjustment parameters;
    establishing a knowledge map of the parameters based on an association coefficient of each of the two parameters;
    wherein the knowledge map comprises nodes representing the parameters and connecting lines between nodes representing an association relationship between parameters; and
    in the knowledge map, the size of each node is directly proportional to the value of the influence coefficient of the parameter represented by the node, and the nodes corresponding to the important optimization parameters and the adjustment parameters are highlighted.

2. The method according to claim 1, wherein determining each current correlation coefficient between the parameter and each performance index based on the one-to-one function relationships comprises:
    for a current value of each parameter, determining a tangent slope of the current value in a function image of the one-to-one functional relationship between the parameter and a performance index as the current correlation coefficient between the parameter and the performance index.

3. The method according to claim 1, further comprising establishing a correlation coefficient table between each parameter and each performance index utilizing the current correlation coefficient between each parameter and each performance index.

4. The method according to claim 3, further comprising adopting different colors in the correlation coefficient table to represent different values of the current correlation coefficients to obtain a correlation nephogram of the parameters and the performance indexes.

5. The method according to claim 3, wherein obtaining the current influence coefficient of each parameter on the comprehensive performance of the performance indexes comprises:
    bringing current weight of each performance index into the correlation coefficient table to obtain a weighted correlation coefficient table; and
    adding a weighted current correlation coefficient corresponding to the same parameter in the weighted correlation coefficient table to obtain the current influence coefficient of each parameter on the comprehensive performance.

6. The method according to claim 1, further comprising:
    calculating a comprehensive score representing the comprehensive performance of the performance indexes according to the weights of the performance indexes and the current values of the performance indexes;

when the comprehensive score is greater than or equal to a predetermined threshold, determining parameters corresponding to the comprehensive score as final optimization parameters; otherwise, performing the process of determining each current correlation coefficient between the parameter and each performance index based on the one-to-one function relationships;

wherein performing parameter optimization based on the important optimization parameters and the adjustment parameters comprises:

adjusting values of the parameters according to a predetermined rule including adjusting values of the important optimization parameter and adjustment parameters first; or adjusting only values of the important optimization parameter and adjustment parameters; then returning to the process of establishing the one-to-one functional relationship between each parameter and each performance index based on the function relationships between each performance index and all parameters.

7. The method according to claim 6, further comprising, in response of a change of the current weights, returning to the process of calculating a comprehensive score representing a comprehensive performance of the performance indexes according to the weights of the performance indexes and the current values of the performance indexes.

8. The method according to claim 6, further comprising, in response to a change of the important optimization parameter and adjustment parameters, performing the parameter optimization based on changed important optimization parameters and the adjustment parameters.

9. A parameter optimization device comprising:
a first hardware module operating to establish a one-to-one functional relationship between each parameter and each performance index based on function relationships between each performance index and all of the parameters;
a second hardware module operating to determine each current correlation coefficient between the parameter and each performance index based on the one-to-one function relationships;
a third hardware module operating to obtain a current weight of each performance index;
a fourth hardware module operating to obtain a current influence coefficient of each parameter on a comprehensive performance of the performance indexes according to the current weights and the current correlation coefficients, and to determine a parameter whose current influence coefficient reaches a set high threshold as an important optimization parameter, or to determine a first of the one or more parameters as the parameter with a highest current influence coefficient of the one or more parameters as an important optimization parameter;
a fifth hardware module, for each two parameters, operating to calculate a current correlation coefficient of the two parameters according to the current weights and the current correlation coefficient between each of the two parameters and each performance index, and to determine the parameter whose current correlation coefficient with the important optimization parameter meets set requirements as an adjustment parameter; and
a sixth hardware module operating to perform parameter optimization based on the important optimization parameters and the adjustment parameters.

10. The device according to claim 9, further comprising:
a seventh module operating to establish a correlation coefficient table between each parameter and each performance index utilizing the current correlation coefficient between each parameter and each performance index;
in the correlation coefficient table, different colors are adopted to represent different values of the current correlation coefficients to obtain a correlation nephogram of the parameters and the performance indexes.

11. The device according to claim 10, wherein the fourth module operates to bring the current weight of each performance index into the correlation coefficient table to obtain a weighted correlation coefficient table, and to add a weighted current correlation coefficient corresponding to the same parameter in the weighted correlation coefficient table to obtain the current influence coefficient of each parameter on the comprehensive performance.

12. The device according to claim 9, further comprising:
an eighth module operating to establish a knowledge map of parameters based on an association coefficient of each of the two parameters;
wherein the knowledge map comprises nodes representing the parameters and connecting lines between nodes representing an association relationship between the parameters; and
in the knowledge map, the size of each node is directly proportional to the value of the influence coefficient of the parameter represented by the node, and the nodes corresponding to the important optimization parameters and the adjustment parameters are highlighted.

13. The device according to claim 9, further comprising:
a ninth module operating to calculate a comprehensive score representing the comprehensive performance of the performance indexes according to the weights of the performance indexes and the current values of the performance indexes; and
a tenth module operating to determine parameters corresponding to the comprehensive score as final optimization parameters when the comprehensive score is greater than or equal to a predetermined threshold; otherwise, to inform the second module to perform corresponding processes;
wherein the sixth module further operates to adjust values of the parameters according to a predetermined rule including adjusting values of the important optimization parameter and adjustment parameters first, or to adjust only values of the important optimization parameter and the adjustment parameters, then indicate the first module to perform corresponding processes.

14. A parameter optimization device comprising:
at least one non-transitory memory storing a computer program; and
at least one processor to call the computer program stored in the at least one non-transitory memory to perform a parameter optimization method including:
establishing a one-to-one functional relationship between each parameter of a set of parameters and each performance index of a set of performance indexes based on function relationships between each performance index and all parameters of the set of parameters;
determining each current correlation coefficient between the parameter and each performance index based on the one-to-one function relationships;
obtaining a current weight of each performance index;
according to the current weights and the current correlation coefficients, obtaining a current influence coefficient of each parameter on a comprehensive performance of the performance indexes;

determining a parameter whose current influence coefficient reaches a set high threshold as an important optimization parameter, or determining a first of the one or more parameters with a highest current influence coefficient among the one or more parameters as an important optimization parameter;

for each two parameters, calculating a current correlation coefficient of the two parameters according to the current weights and the current correlation coefficient between each of the two parameters and each performance index, and determining the parameter whose current correlation coefficient with the important optimization parameter meets set requirements as an adjustment parameter; and performing parameter optimization based on the important optimization parameters and the adjustment parameters.

\* \* \* \* \*